United States Patent
Jones

Patent Number: 5,549,316
Date of Patent: Aug. 27, 1996

[54] TRAILER HITCH GUIDE

[76] Inventor: Robert B. Jones, 4616 109Th Pl. NE., Marysville, Wash. 98271

[21] Appl. No.: 515,836

[22] Filed: Aug. 16, 1995

[51] Int. Cl.⁶ .................................................. B60D 1/36
[52] U.S. Cl. .......................................... 280/477; 280/511
[58] Field of Search .................................. 280/477, 504, 280/507, 508, 511, 478.1

[56] References Cited

U.S. PATENT DOCUMENTS

| | | | |
|---|---|---|---|
| 3,944,259 | 3/1976 | Miller | 280/477 X |
| 4,226,438 | 10/1980 | Collins | 280/477 |
| 4,844,496 | 7/1989 | Webb et al. | 280/477 |
| 4,871,184 | 10/1989 | Johnson | 280/477 |
| 5,236,215 | 8/1993 | Wylie | 280/477 |
| 5,288,096 | 2/1994 | Degelman | 280/477 X |
| 5,330,196 | 7/1994 | Ricles | 280/477 |

*Primary Examiner*—Anne Marie Boehler
*Assistant Examiner*—Victor E. Johnson
*Attorney, Agent, or Firm*—Joseph H. McGlynn

[57] ABSTRACT

A guide, for guiding the towing tongue on a trailer onto the standard ball type hitch, which consists of vertical oriented plates attached to a horizontal plate which has an aperture that will receive the standard ball type hitch. The horizontal plate has an steel tube extension on it which will fit into the standard box receivers secured to a towing vehicle.

3 Claims, 1 Drawing Sheet

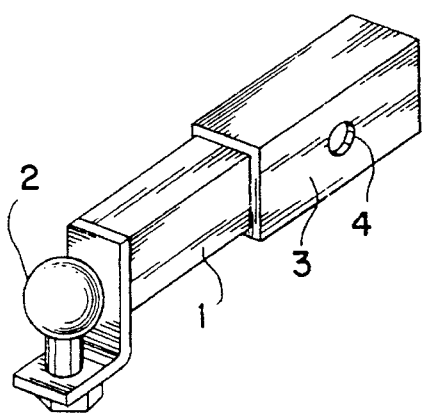
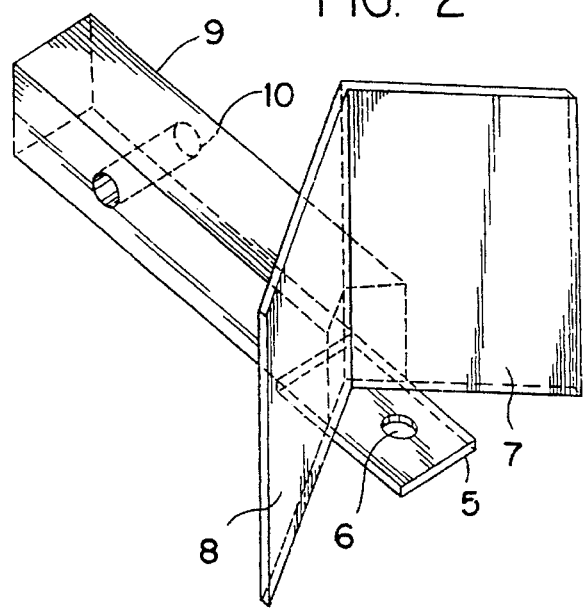
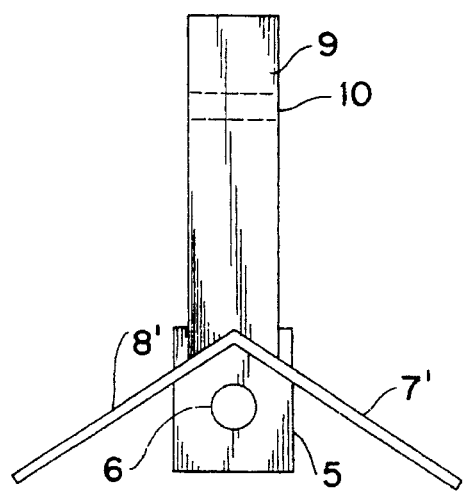
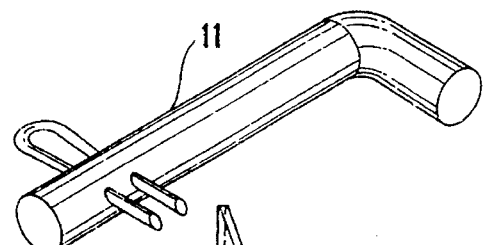
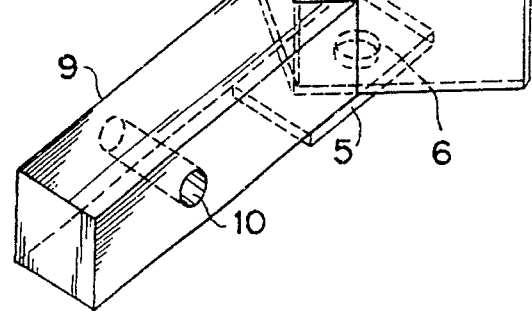

5,549,316

TRAILER HITCH GUIDE

BACKGROUND OF THE INVENTION

This invention relates in general to guides for trailer hitches and in particular to an improved guide which will mount inside the box receivers which are standard on most trailer hitches.

DESCRIPTION OF THE PRIOR ART

In the prior art the use of guiding devices for guiding a hitch tongue on a trailer onto the standard ball type hitch mounted on the rear portion of the towing vehicle is well known. For example, in U.S. Pat. Nos. 4,844,496 and 4,871,184,, a slidably positionable guide having a plurality of vertical flanges is provided with a slotted plate that slides beneath the ball type hitch. In U.S. Pat. No. 5,330,196, a vertical guide having a slot attaches behind the ball type hitch. In U.S. Pat. No. 5,236,215, a pair of parallel disposed horizontal bars are mounted on opposite sides of the ball type hitch.

Therefore, while the concept of a trailer hitch guide is not new, the prior art devices have all been vulnerable to bending damage as the trailer tongue is being mounted on the ball type hitch, or the devices require extensive work or expertise, such as welding, to assemble on the towing vehicle.

SUMMARY OF THE INVENTION

The present invention is an improved guide for guiding a hitch tongue on a trailer onto the standard ball type hitch mounted on the rear portion of the towing vehicle. The guide consists of vertical oriented plates which are attached to a horizontal plate which has an aperture which will receive the standard ball type hitch and a tube steel extension on the horizontal plate which will fit into the standard box receiver behind the ball type hitch.

It is an object of the present invention to provided an improved towing hitch guide which can be easily and quickly assembled onto a towing hitch without any special tools.

It is an object of the present invention to provided an improved towing hitch guide which is inexpensive to manufacture.

It is an object of the present invention to provided an improved towing hitch guide which is strong enough to withstand the force of a towing tongue being engaged with a ball type hitch.

It is an object of the present invention to provided an improved towing hitch guide which a person can use without any help from a second person.

It is an object of the present invention to provided an improved towing hitch guide which will also protect the rear bumper, license plates and other component parts on the rear of the towing vehicle.

These and other objects and advantages of the present invention will be fully apparent from the following description, when taken in connection with the annexed drawings.

BRIEF DESCRIPTION OF THE DRAWINGS

FIG. 1 is a perspective view of a standard ball type hitch attached to the rear of a towing vehicle.

FIG. 2 is a perspective view of the present invention.

FIG. 3 is a plan view of the present invention.

FIG. 4 is a perspective view of a coupling pin used with the present invention.

FIG. 5 is a view showing the back end of the present invention.

DESCRIPTION OF THE PREFERRED EMBODIMENT

Referring to the drawings in greater detail, FIG. 1 shows a standard ball type hitch 2 mounted on a tongue 1 which slides into a box receiver 3. The box receiver is generally attached to the towing vehicle either to the rear bumper or to some other portion at the rear of the vehicle.

The present invention, shown in FIG. 2, consists of a first horizontal plate 5 attached to which is a pair of vertical plates 7 and 8. The vertical plates are welded to each other so the plates form an included angle of approximately 120°. The vertical plates are also welded to the horizontal plate 5. The horizontal plate 5 has an aperture 6 which is large enough so the aperture will receive the mounting shank of the ball 2. Attached to the rear of the plate 5 is a steel tube 9 which will fit into the box receiver 3. The steel tube 9 has an aperture 10 which is smaller than aperture 6 and will be used for a purpose to be explained later.

All of the plates are made from mild steel, although other material may also be used without departing from the scope of the invention. Also, the plates will all be welded to each other at the various points where they meet. Other methods of joining the plates may also be used without departing from the scope of the present invention. For example, the plates 7 and 8 may be made as a single plate and bent into a V-shape as shown at 7' and 8' in FIG. 3.

In use, the tube 9 is first inserted into the box receiver 3. Usually the box receiver has an aperture shown at 4 in FIG. 1 which will receive a pin, similar to the pin 11 shown in FIG. 4. This pin is used to secure the tongue 1 to the box receiver 3. The aperture 10 in steel tube 9 will be positioned so the aperture 10 will align with the aperture 4 when the tube 9 is positioned in the box receiver 3. Now all that is necessary to secure the hitch guide is to insert pin 11 through apertures 4 and 10.

Once the guide is installed on the box receiver, all that is necessary to attach a trailer is to back up the towing vehicle until the tongue on the trailer engages one of the plates 7 or 8. If the tongue is not properly aligned the angled plates will automatically align the tongue. When the tongue engages the position where the plates are joined, the aperture in the trailer tongue will be directly over the ball 2 and can be attached in the normal manner.

The principal advantage in the present invention over prior art devices is the guide can be installed by anyone in just a few minutes without using any special tools.

Although the towing hitch guide and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A trailer hitch guide apparatus for use in combination with a receiving means for receiving a trailer tongue coupler, said trailer hitch guide apparatus comprising:

a first plate having a contiguous aperture which has a diameter that is smaller than an outside diameter of a trailer hitch ball and larger than a shank on said trailer hitch ball, said first plate having a length and a width, a pair of plates attached to said first plate, said pair of plates having a front and a back side, said pair of plates being attached to each other at an angle of approximately 120°, a tube attached to said first plate and to said back side of said pair of plates, said tube being rectangular and having a length, width and a height, said length of said tube being parallel to said length of said first plate, said first plate extending from said pair of plates on said front side and said back side, said tube extending horizontally from said back side of said pair of plates, said tube also extending vertically along said back side of said pair of plates, said tube having a horizontal aperture therethrough.

2. The trailer hitch guide apparatus as claimed in claim 1, wherein said pair of plates are unitary.

3. The trailer hitch guide apparatus as claimed in claim 1, wherein said tube has a V-shaped notch and said back side of said pair of plates is secured within said notch.

* * * * *